(12) United States Patent
Reese et al.

(10) Patent No.: US 8,163,398 B2
(45) Date of Patent: Apr. 24, 2012

(54) LEATHER PRODUCTION METHOD AND PRODUCTS SUITED THEREOF

(75) Inventors: Oliver Reese, Lemforde (DE); Stephan Huffer, Ludwigshafen (DE); Guenter Scherr, Ludwigshafen (DE); Bernhard Albert, Wachenheim (DE)

(73) Assignee: BASF SE, Ludwigshafen (DE)

( * ) Notice: Subject to any disclaimer, the term of this patent is extended or adjusted under 35 U.S.C. 154(b) by 835 days.

(21) Appl. No.: 12/090,394

(22) PCT Filed: Oct. 12, 2006

(86) PCT No.: PCT/EP2006/067302
§ 371 (c)(1),
(2), (4) Date: Apr. 16, 2008

(87) PCT Pub. No.: WO2007/045585
PCT Pub. Date: Apr. 26, 2007

(65) Prior Publication Data
US 2008/0248322 A1  Oct. 9, 2008

(30) Foreign Application Priority Data
Oct. 18, 2005 (DE) .......................... 10 2005 050 193

(51) Int. Cl.
*C14C 9/00* (2006.01)

(52) U.S. Cl. .......................... 428/540; 528/370; 424/402
(58) Field of Classification Search .................. 428/540; 528/370; 424/402
See application file for complete search history.

(56) References Cited

U.S. PATENT DOCUMENTS

| 3,549,692 A | 12/1970 | Böckmann et al. |
| 4,822,372 A | 4/1989 | Forster et al. |
| 6,020,499 A | 2/2000 | Drysdale et al. |
| 6,379,751 B1 * | 4/2002 | Schafer et al. ............... 427/389 |
| 7,507,818 B2 * | 3/2009 | Schneider et al. ............ 544/196 |
| 2004/0254292 A1 | 12/2004 | Williams |
| 2006/0069254 A1 * | 3/2006 | Schneider et al. ............ 544/112 |

FOREIGN PATENT DOCUMENTS

| DE | 1 280 240 | 10/1968 |
| DE | 39 33 478 | 4/1991 |
| EP | 0 264 628 | 4/1988 |
| EP | 0 600 417 | 6/1994 |
| JP | 56-071062 | 6/1981 |
| WO | WO 2004/054990 | * 7/2004 |

* cited by examiner

*Primary Examiner* — Gregory Listvoyb
(74) *Attorney, Agent, or Firm* — Connolly Bove Lodge & Hutz LLP

(57) ABSTRACT

Process for the production of leather using products obtainable by reacting (A) at least one cyclic organic carbonate with (B) at least one compound having at least two nucleophilic groups per molecule, selected from sulfonic acid, hydroxyl, primary or secondary amino or mercapto groups.

3 Claims, No Drawings

LEATHER PRODUCTION METHOD AND PRODUCTS SUITED THEREOF

CROSS REFERENCE TO RELATED APPLICATIONS

This application is a National Phase filing under 35 U.S.C. §371 of PCT/EP2006/067302 filed Oct. 12, 2006, which claims priority to Patent Application No. 102005050193.1, filed in Germany on Oct. 18, 2005. The entire contents of each of the above-applications are incorporated herein by reference.

The present invention relates to a process for the production of leather using products obtainable by reacting
(A) at least one cyclic organic carbonate with
(B) at least one compound having at least two nucleophilic groups per molecule, selected from sulfonic acid, hydroxyl, primary or secondary amino or mercapto groups.

Numerous commercial resin tanning agents are condensates of one or more aldehydes, such as, for example, formaldehyde, and one or more nitrogen compounds, such as, for example, melamine. In many cases, such resin tanning agents give leather having good fullness, softness and intensity of the dyeing but are generally not good enough. Moreover, such leathers generally release aldehyde, in the majority of examples formaldehyde, which is undesired for toxicological reasons.

It was therefore the object to provide a process for the production of leather which avoids the abovementioned disadvantages and gives leather having good fullness, softness and intensity of the dyeing and further good performance characteristics.

Accordingly, the process defined at the outset was found.

The process defined at the outset was carried out starting from hides of animals, such as, for example, cattle, pigs, goats or deer, which have been pretreated by conventional methods, so-called pelts. It is not important for the process according to the invention whether, for example, the animals were killed by slaughtering or died of natural causes. The conventional methods of pretreatment include, for example, liming, deliming, bating and pickling and mechanical operations, for example fleshing of the hides.

The process according to the invention is carried out using one or more products obtainable by reacting
(A) at least one cyclic organic carbonate with
(B) at least one compound having at least two nucleophilic groups per molecule, selected from sulfonic acid, hydroxyl, primary or secondary amino or mercapto groups.

In the context of the present invention, cyclic organic carbonates (A) are understood as meaning organic carbonic acid esters which have at least one cyclic group. Cyclic organic carbonates are preferably those organic carbonic acid esters in which the carbonic acid ester group is part of a cyclic system.

In an embodiment of the present invention, cyclic organic carbonate (A) is selected from compounds of the general formula I

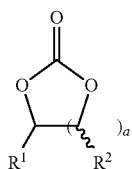

the variables being defined as follows:
$R^1$ is selected from $C_1$-$C_4$-alkyl, branched or preferably linear, for example methyl, ethyl, n-propyl, isopropyl, n-butyl, isobutyl, sec-butyl and tert-butyl, very preferably methyl and ethyl, and very particularly preferably hydrogen, $R^2$ are, if appropriate, different or preferably identical and, independently of one another, are selected from hydrogen and $C_1$-$C_4$-alkyl, branched or preferably linear, for example methyl, ethyl, n-propyl, isopropyl, n-butyl, isobutyl, sec-butyl and tert-butyl, very preferably methyl and ethyl, and very particularly preferably are each identical and are hydrogen, a is an integer in the range of from 1 to 3, preferably 2 and particularly preferably 1.

Particularly preferred cyclic organic carbonates (A) are propylene carbonate, ethylene carbonate and mixtures of propylene carbonate ($R^1$=methyl, $R^2$=hydrogen, a=1) and ethylene carbonate ($R^1$=$R^2$=hydrogen, a=1), in particular those mixtures of propylene carbonate and ethylene carbonate which are liquid at room temperature.

In the context of the present invention, compounds (B) having at least two nucleophilic groups per molecule, selected from sulfonic acid, hydroxyl, mercapto and primary or secondary amino groups, also referred to as compounds (B) for short, are those compounds which have two groups capable of undergoing nucleophilic reactions, such as, for example, sulfonic acid groups, hydroxyl groups, mercapto groups or primary or secondary amino groups.

Examples of suitable compounds (B) may have: at least two nucleophilic hydroxyl groups per molecule, at least two nucleophilic mercapto groups per molecule, at least two nucleophilic primary or secondary amino groups per molecule, for example two or three nucleophilic primary or secondary amino groups per molecule, at least one nucleophilic hydroxyl group or mercapto group and at least one nucleophilic primary or secondary amino group per molecule or at least one nucleophilic hydroxyl group and at least one nucleophilic mercapto group per molecule, at least one nucleophilic hydroxyl group or primary or secondary amino group and one sulfonic acid group per molecule Sulfuric acid is not a compound (B) in the context of the present invention.

Examples of nucleophilic hydroxyl groups are OH groups or primary and secondary alcohols and in particular phenolic OH groups.

Examples of nucleophilic mercapto groups are SH groups, aliphatic or aromatic.

Examples of nucleophilic amino groups are —$NHR^3$ groups, aliphatic or aromatic, $R^3$ being selected from hydrogen, $C_1$-$C_4$-alkyl as defined above and CN, or the $NH_2$ group of, for example, amidosulfonic acid.

OH groups and NH groups which are part of aminal groups, hemiaminal groups or hydrate groups of ketones or aldehydes are not nucleophilic hydroxyl groups or amino groups in the context of the present invention. Furthermore, OH groups and $NH_2$ groups which are part of carboxyl groups or carboxamide groups are not nucleophilic hydroxyl groups or amino groups in the context of the present invention.

Preferred examples of compounds (B) are ureas, unsubstituted or mono- or di-N,N'-substituted by $C_1$-$C_4$-alkyl, biuret, in particular unsubstituted urea (B1), heterocyclic compounds having at least two $NH_2$ groups per molecule (B2), for example adenine and in particular melamine, benzoguanamine,
dicyandiamide (B3), guanidine (B4),
Compounds of the General Formula II

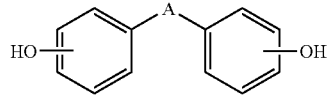

in which A is a bivalent group, for example —CH$_2$—, —CH$_2$CH$_2$—, —CH(CH$_3$)—, —C(CH$_3$)$_2$—, —CO—, —SO$_2$—, preferably 4,4'-dihydroxybiphenyl, 2,4'-dihydroxydiphenyl sulfone, particularly preferably 4,4'-dihydroxydiphenylsulfone (B5), mixtures of 4,4'-dihydroxydiphenyl sulfone and 2,4'-dihydroxydiphenyl sulfone, for example in a weight ratio of from 8:1 to 8:1.5, and bisphenol A (B6).

Further preferred examples of compound (B) are 4-hydroxyphenylsulfonic acid (B7) and amidosulfonic acid (B8).

In an embodiment of the present invention, cyclic organic carbonate (A) is reacted with compound (B) in a molar ratio in the range of from 2:1 to 100:1, preferably from 5:1 to 20:1.

In an embodiment of the present invention cyclic organic carbonate (A) is reacted with compound (B) in the presence of a base. For example, basic alkaline earth metal or alkali metal salts, e.g. hydroxides and carbonates of sodium or potassium, and furthermore amines, in particular tertiary amines, such as, for example, pyridine, tri-C$_1$-C$_4$-alkylamine, such as, for example, trimethylamine, triethylamine, isopropyl-diethylamine, and bicyclic amines, such as, for example, 1,4-diazabicyclo[2.2.2]octane, are suitable as the base. For example, catalytic amounts of base may be used, for example from 0.001 to 10 mol % of base, based on compound (B).

In an embodiment of the present invention, cyclic organic carbonate (A) is reacted with compound (B) at temperatures in the range of from 150° to the boiling point of cyclic organic carbonate (A) or compound (B), depending on which is more readily volatile, preferably at least 165° C.

Cyclic organic carbonate (A) can be reacted with compound (B) at any desired pressure, for example from 0.1 bar to 10 bar. Cyclic organic carbonate (A) is reacted with compound (B) preferably at atmospheric pressure.

In an embodiment of the present invention, cyclic organic carbonate (A) is reacted with compound (B) over a period of from 5 minutes to 24 hours. In the reaction of cyclic organic carbonate (A) with compound (B), in general gas evolution in the form of, for example, frothing or effervescence is observed. In an embodiment of the present invention, the reaction of cyclic organic carbonate (A) with compound (B) is stopped when gas evolution is no longer observable.

In an embodiment of the present invention, neutralization can be effected, for example with mineral acid, such as, for example, sulfuric acid, after the end of the reaction. A suitable pH of the neutralization may be in the range of from 4.5 to 7.

In an embodiment of the present invention, the product obtained by reacting cyclic organic carbonate (A) with compound (B) can be purified after reaction and, if appropriate, neutralization are complete; for example inorganic salts can be separated off by extraction or ultrafiltration.

In an embodiment of the present invention, the reaction of cyclic organic carbonate (A) with compound (B) is carried out in the presence of at least one phenol, unsubstituted or mono- or polysubstituted by SO$_3$H.

In an embodiment of the present invention, the purification of product obtained by reaction of cyclic organic carbonate (A) with compound (B) and, if appropriate, neutralization is dispensed with.

In an embodiment of the present invention, product obtained by reaction of cyclic organic carbonate (A) with compound (B) and, if appropriate, neutralization can be dried, for example by evaporating down and preferably by spray drying. A powder is then obtained.

For carrying out the process according to the invention, product obtained by reaction of cyclic organic carbonate (A) with compound (B) and, if appropriate, neutralization can be used as aqueous formulation. In another embodiment of the present invention, product obtained by reaction of cyclic organic carbonate (A) with compound (B) and, if appropriate, neutralization is used as powder.

In an embodiment of the present invention, the process according to the invention is carried out as a tanning process, also referred to below as tanning process according to the invention, preferably as a retanning process, also referred to below as retanning process according to the invention.

The tanning process according to the invention is generally carried out in such as way that product obtained by reaction of cyclic organic carbonate (A) with compound (B) is added in one portion or in a plurality of portions immediately before or during the tanning step. The tanning process according to the invention is preferably carried out at a pH of from 2.5 to 4, it frequently being observed that the pH increases by about 0.3 to three units while the tanning process according to the invention is being carried out. The pH can also be increased by about 0.3 to 3 units by adding basifying agents.

The tanning process according to the invention is generally carried out at temperatures of from 10 to 45°, preferably at from 20 to 30° C. A duration of from 10 minutes to 12 hours has proven useful, from one to three hours being preferred. The tanning process according to the invention can be carried in at any desired vessels customary in tanning, for example by drumming in barrels or in rotated drums.

In an embodiment of the present invention, from 0.01 to 10% by weight of product obtained by reaction of cyclic organic carbonate (A) with compound (B), based on shaved weight, are used.

In a variant of the tanning process according to the invention, product obtained by reaction of cyclic organic carbonate (A) with compound (B) is used together with one or more conventional tanning agents, for example with chrome tanning agents, mineral tanning agents, syntans, polymer tanning agents or vegetable tanning agents, as described, for example, in *Ullmann's Encyclopedia of Industrial Chemistry*, volume A15, pages 259 to 282 and in particular page 268 et seq., 5th edition, (1990), Verlag Chemie Weinheim. The weight ratio of product obtained by reaction of cyclic organic carbonate (A) with compound (B) to conventional tanning agent or sum of the conventional tanning agent is expediently from 0.01:1 to 100:1. In an advantageous variant of the process according to the invention only a few ppm of the conventional tanning agents are added to the above-described product obtained by reaction of cyclic organic carbonate (A) with compound (B).

In a variant of the tanning process according to the invention, product obtained by reaction of cyclic organic carbonate (A) with compound (B), is added in one portion or in a plurality of portions before or during the pretanning, in a particular variant in the pickling itself.

The retanning process according to the invention is carried out starting from semifinished products tanned in a conventional manner, i.e. for example with chrome tanning agents, mineral tanning agents, polymer tanning agents, aldehydes, syntans or resin tanning agents, or from semifinished products produced according to the invention as described above. For carrying out the retanning according to the invention, product obtained by reaction of cyclic organic carbonate (A) with compound (B) is allowed to act on semifinished products.

The retanning process according to the invention can be carried out under otherwise customary conditions. Expediently, one or more, i.e. from 2 to 6, soaking steps are chosen and washing with water can be effected between the soaking steps. The temperature during the individual soaking steps is in each case from 5 to 60° C., preferably from 20 to 45° C. Expediently, one or more further agents usually used during retanning, for example fat liquors, polymer tanning agents and acrylate and/or methacrylate-based fatliquoring agents, retanning agents based on vegetable tanning agents, fillers, leather dyes or emulsifiers, are used.

The present invention furthermore relates to leathers produced by the process according to the invention. Leathers according to the invention are distinguished by good fullness, softness and intensity of dyeing and further good performance characteristics. Leathers according to the invention are suitable, for example, for the production of shoes or interior automotive parts, such as, for example, car seats, and in particular for the production of articles of clothing, such as, for example, belts, jackets, coats and pants, and furthermore, for example, for the production of pieces of furniture and of handbags.

The present invention furthermore relates to products obtainable by reacting
(A) at least one cyclic organic carbonate with
(B) at least one compound having at least two nucleophilic groups per molecule, selected from hydroxyl, mercapto or primary or secondary amino groups,
in a molar ratio in the range of from 2:1 to 100:1, preferably from 5:1 to 20:1. Products according to the invention may comprise one or more alkaline earth metal, ammonium or preferably alkali metal salts, in particular alkali metal sulfate.

In an embodiment of the present invention, products according to the invention have an average molecular weight $M_w$ in the range of from 250 to 1 000 000 g/mol, preferably from 300 to 100 000 g/mol, particularly preferably from 500 to 10 000 g/mol and very particularly preferably up to 5000 g/mol.

In an embodiment of the present invention, products according to the invention have a narrow molecular weight distribution; for example, the quotient $M_w/M_n$ may be in the range of from 1.6 to 3, preferably up to 2.6.

Products according to the invention are particularly suitable for carrying out the process according to the invention. The present invention furthermore relates to the use of product according to the invention for the production of leather, for example as tanning agents or retanning agents.

The present invention furthermore relates to aqueous formulations, for example aqueous solutions, comprising at least one product according to the invention. Aqueous formulations according to the invention may be colorless, yellowish or brownish and have a solids content in the range of from 1 to 90% by weight, preferably from 30 to 75% by weight. Aqueous formulations according to the invention are particularly suitable for carrying out the process according to the invention and can be readily metered. The present invention furthermore relates to the use of the aqueous formulation according to the invention for the production of leather, for example as tanning agents or retanning agents.

The present invention furthermore relates to a process for the production of products according to the invention, also referred to below as preparation process according to the invention, by reacting
(A) at least one cyclic organic carbonate with
(B) at least one compound having at least two nucleophilic groups per molecule, selected from hydroxyl, mercapto or primary or secondary amino groups,
in a molar ratio in the range of from 2:1 to 100:1, preferably from 5:1 to 20:1.

Further details of the preparation process according to the invention are described above.

The invention is explained by working examples

I. Preparation of Products According to the Invention and Comparative Tanning Agents The solids content was determined by evaporating the volatile constituents.

I.1. Preparation of Product P1 According to the Invention 24.0 g (190 mmol) of melamine, 200 g (2.27 mol) of ethylene carbonate and 1.40 g (17.5 mmol) of aqueous sodium hydroxide solution (50% by weight) were initially taken in a flask and heated to 170° C. with stirring. The mixture thus obtained was stirred at 170° C. until gas evolution was no longer observable. Thereafter, cooling to room temperature was effected and 102 g of water were added. A pH of 5 was established with aqueous sulfuric acid (50% by weight). About 250 g of the product P1 according to the invention were obtained. Solids content: 48%.

I.2. Preparation of Product P2 According to the Invention 107 g (848 mmol) of melamine, 893 g (10.1 mol) of ethylene carbonate and 0.90 g (6.51 mmol) of potassium carbonate were additionally taken in a flask and heated to 170° C. with stirring. The mixture thus obtained was stirred at 170° C. until gas evolution was no longer observable. Thereafter, cooling to room temperature was effected and 292 g of water were added. A pH of 5 was established with aqueous sulfuric acid (50% by weight). About 1000 g of the product P2 according to the invention were obtained. Solids content: 59%.

I.3. Preparation of Product P3 According to the Invention 24.0 g (190 mmol) of melamine, 300 g (2.94 mol) of propylene carbonate and 6.30 g (56.2 mmol) of DABCO® (1,4-diazabicyclo[2.2.2]octane, Air Products and Chemicals Inc.) were initially taken in a flask and heated to 170° C. with stirring. The mixture thus obtained was stirred at 170° C. until gas evolution was no longer observable. Thereafter, low molecular weight impurities were distilled off at about 160° C. under reduced pressure (700 mbar). Thereafter, cooling to room temperature was effected. A pH of 5 was established with aqueous sulfuric acid (50% by weight). About 153 g of the product P3 according to the invention were obtained. Solids content: 58%.

I.4. Preparation of Product P4 According to the Invention 62.5 g (250 mmol) of 4,4'-dihydroxydiphenyl sulfone, 306 g (3.00 mol) of propylene carbonate and 3.45 g (25.0 mmol) of potassium carbonate were initially taken in a flask and heated slowly to 170° C. with stirring. The mixture thus obtained was stirred at 170° C. until gas evolution was no longer observable. Thereafter, cooling to room temperature was effected and a pH of 5 was established with aqueous sulfuric acid (50% by weight). 200 g of the product P4 according to the invention were obtained. Solids content: 75%.

I.5. Preparation of Product P5 According to the Invention 7.60 g (127 mmol) of urea, 200 g (2.27 mol) of ethylene carbonate and 1.5 g (10.9 mmol) of potassium carbonate were initially taken in a flask and heated to 170° C. with stirring. The mixture thus obtained was stirred at 170° C. until gas evolution was no longer observable. Thereafter, cooling to room temperature was effected, 125 g of water were added and a pH of 5 was established with aqueous sulfuric acid (50% by weight). 250 g of the product P5 according to the invention were obtained. Solids content: 47%.

Tanning Agents for Comparative Examples

Preparation of Comparative Product V-P6

0.5 mol of sodium sulfite was initially taken as 40% by weight aqueous solution in a flask, and 30 g (1 mol) of formaldehyde in the form of a 30% aqueous solution were added. The solution thus obtainable was heated to 70° C., and a mixture of 0.11 mol of melamine in 32 ml of water was added. The temperature was increased to 80° C. and stirring was effected for two hours at 80° C. Thereafter, a solution of 23 mol of urea in 6.5 ml of water was added and stirring was effected for a further hour at 80° C. Thereafter, 0.14 mol of NaOH as a 50% by weight aqueous solution was added and stirring was effected for a further two hours at 80° C. Thereafter, cooling to room temperature was effected and a pH of 8 was established with formic acid. A clear, low temperature-stable solution of comparative product V-P6 in water was obtained, solids content 40%

Preparation of Comparative Product V-P7

Stage 1:

4 mol of oleum ($SO_3$ content: 24% by weight) were added in the course of 10 minutes to 4 mol of phenol heated to 60° C. The resulting mixture was heated to 160° C. Stirring was effected for 4 hours at 160° C., followed by cooling to 80° C. 2.5 mol of urea as a 68% by weight aqueous solution were stirred in, and 4 mol of formaldehyde as a 30% by weight aqueous solution were then metered in the course of 10 minutes.

Stage 2:

1 mol of industrial dihydroxydiphenyl sulfone (mixture of 80% by weight of 4,4'-dihydroxydiphenyl sulfone, 15% by weight of 2,4'-dihydroxydiphenyl sulfone and 5% by weight of para-phenolsulfonic acid) as a 60% by weight aqueous solution was initially taken in an autoclave and 1.2 mol of formaldehyde as a 30% by weight aqueous solution and 0.65 mol of solid sodium sulfite were added. The autoclave was closed and heated to an internal temperature of 115° C. The internal temperature increased spontaneously to about 155° C. under pressure to 4 to 5 bar. Stirring was effected for three hours at 155° C., cooling to room temperature was carried out and the pressure was let down to atmospheric pressure.

A mixture of 30 parts by weight of stage 1 with 70 parts by weight of stage 2 was prepared. For this purpose, 300 g of stage 1 was initially taken and was mixed with 700 g of stage 2. Stirring was effected over a period of 4 hours at room temperature and a pH of 4.5 was then established with formic acid and dilution with 50 ml of water was effected. Comparative product V-P7 was obtained, solids content 42%.

Comparative Product V-P8

For comparison, an aqueous solution of polyacrylic acid partly neutralized with sodium hydroxide solution and having a molar mass ($M_n$) of 18 000 g/mol, a pH of 5 and a solids content of 40% is used.

II. Production of Leather—Use of P1 to V-P8 as Retanning Agents

Data and % by weight designate the active substance and are based in each case on the shaved weight, unless stated otherwise.

100 parts by weight of chrome-tanned cattle leather having a shaved thickness of from 1.8 to 2.0 mm were drummed with 200% of water in a rotatable barrel (50 l) having baffles at 30° C. for 10 minutes. Thereafter, the water was discharged and the cattle leather was drummed with 1% by weight of sodium formate and 1.5% by weight of a naphthalene sulfonic acid/formaldehyde condensate, prepared according to U.S. Pat. No. 5,186,846, example "Dispersant 1" in 100% of water (60 minutes), neutralization taking place. The cattle leather thus pretreated was then cut in the core region into 8 strips of about 500 g each.

The retanning is effected in eight separate 10 l dose barrels. Each strip of the cattle leather thus pretreated was drummed with 6% by weight of product according to table 1 and 100% by weight of water at 40° C. and a pH of 4.5 over a period of 45 minutes. In each case 1% by weight of a dye mixture which had the following composition was then added:

70 parts by weight of dye from EP-B 0 970 148, example 2.18, 30 parts by weight of Acid Brown 75 (iron complex), Color Index 1.7.16.

After a drumming time of a further 90 minutes, acidification was effected with formic acid to a pH of 3.8 and the liquor was discharged after a further 20 minutes. The discharged liquors were assessed with regard to the exhaustion (table 1).

100% by weight of fresh water, 4% by weight of fat liquor FL-1 and 1% by weight of the abovementioned dye mixture were added. After a drumming time of 20 minutes, a further 2% of fat liquor FL-1 was metered and drumming was effected for a further 60 minutes. Finally, a pH of 3.5 was established with about 0.4% by weight of formic acid. After a further 20 minutes, the liquor was discharged. The leathers or comparative leathers according to the invention which were thus obtained were set out, dried on a vacuum drier at 60° C. for 10 minutes and then staked. The leathers L1 to L5 according to the invention and the comparative leathers V-L6 to V-L8 were obtained.

The assessment of the performance characteristics of the leathers L1 to L5 according to the invention and the comparative leathers V-L6 to V-L8 is summarized in table 1.

TABLE 1

Performance characteristics of the leathers L1 to L5 according to the invention and the comparative leathers V-L6 to V-L8

| Retanning agent | Leather | Fullness | Softness | Dyeing: levelness | Dyeing: intensity | Grain tightness | Exhaustion |
|---|---|---|---|---|---|---|---|
| P1 | L1 | 3 | 3.5 | 2.5 | 2.5 | 2 | 1.5 |
| P2 | L2 | 1.5 | 2 | 2 | 1.5 | 2 | 2 |
| P3 | L3 | 2.5 | 2.5 | 2 | 2 | 2.5 | 2 |
| P4 | L4 | 3 | 3 | 2.5 | 3 | 2.5 | 2 |
| P5 | L5 | 3 | 3 | 3 | 2.5 | 3 | 3 |
| V-P6 | V-L6 | 2 | 2.5 | 2.5 | 3 | 2 | 2 |
| V-P7 | V-L7 | 2.5 | 2 | 2.5 | 3.5 | 1.5 | 2 |
| V-P8 | V-L8 | 2.5 | 3 | 3.5 | 4 | 2.5 | 2.5 |

Remarks:

The assessment was effected according to a rating from 1 (very good) to 5 (poor).

It was found that the substances according to the invention can be used very well for the tanning and in the retanning of leather. Regarding the intensity of the dyeing, there are even advantages in comparison with the customary formaldehyde-based tanning agents and especially in comparison with likewise formaldehyde-fee polyacrylic acid.

III. Preparation of a Fat Liquor

In a stirred vessel, 2.3 g of a polyisobutene ($M_n$: 1000 g/mol) were mixed with 300 g of n-$C_{18}H_{37}O(CH_2CH_2O)_{25}H$, 400 g of oleic acid and 2.3 kg of sulfited oxidized triolein and heated to 60° C. Thereafter, 4.7 l of water and 100 g of n-$C_{18}H_{37}O(CH_2CH_2O)_7H$ were added. The resulting emulsion was passed through a gap homogenizer and cooled to room temperature. Fat liquor FL-1 was obtained.

We claim:

1. A leather produced by a process comprising:
    obtaining a product by reacting
    (A) at least one cyclic organic carbonate with
    (B) at least one compound having at least two nucleophilic groups per molecule, selected from sulfonic acid, hydroxyl, primary or secondary amino or mercapto groups
    in a molar ratio in the range of from 5:1 to 20:1;
    preparing an aqueous solution of the product; and
    applying the aqueous solution of the product to the leather before or during the tanning process.

2. The leather of claim 1, wherein the cyclic organic carbonate (A) is selected from compounds of the general formula I

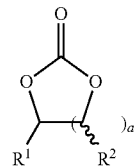

the variables being defined as follows:
   $R^1$ is selected from hydrogen and $C_1$-$C_4$-alkyl, linear or branched,
   $R^2$ are identical or different, and independently of one another, are selected from hydrogen and $C_1$-$C_4$-alkyl, linear or branched, and
   a is an integer in the range from 1 to 3.

3. The leather of claim 1, wherein compounds (B) are selected from
   (B1) urea,
   (B2) heterocyclic compounds having at least two $NH_2$ groups per molecule,
   (B3) dicyandiamide,
   (B4) guanidine,
   (B5) 4,4'-dihydroxydiphenyl sulfone,
   (B6) bisphenol A,
   (B7) 4-hydroxyphenylsulfonic acid, and
   (B8) amidosulfonic acid.

\* \* \* \* \*